(12) United States Patent
Kozodoy et al.

(10) Patent No.: US 12,124,003 B2
(45) Date of Patent: Oct. 22, 2024

(54) METHOD FOR PRODUCING OPTICAL ARTICLE WITH ANTI-REFLECTIVE SURFACE, AND OPTICAL ARTICLE WITH ANTI-REFLECTIVE SURFACE

(71) Applicant: Glint Photonics, Inc., Burlingame, CA (US)

(72) Inventors: Peter Kozodoy, Palo Alto, CA (US); John Lloyd, San Mateo, CA (US)

(73) Assignee: Glint Photonics, Inc., Burlingame, CA (US)

( * ) Notice: Subject to any disclaimer, the term of this patent is extended or adjusted under 35 U.S.C. 154(b) by 507 days.

(21) Appl. No.: 17/241,151

(22) Filed: Apr. 27, 2021

(65) Prior Publication Data

US 2022/0066070 A1   Mar. 3, 2022

Related U.S. Application Data

(60) Provisional application No. 63/015,935, filed on Apr. 27, 2020.

(51) Int. Cl.
*C23F 1/20* (2006.01)
*B29C 33/38* (2006.01)
(Continued)

(52) U.S. Cl.
CPC .......... *G02B 1/118* (2013.01); *B29C 33/3842* (2013.01); *B29C 45/372* (2013.01);
(Continued)

(58) Field of Classification Search
CPC . B29C 33/3842; B29C 33/385; B29C 45/372; B29D 11/00192; B29D 11/00365; B29L 2011/00; C23F 1/20; C25D 11/022; C25D 11/04; C25D 11/06; C25D 11/08; C25D 11/36
(Continued)

(56) References Cited

U.S. PATENT DOCUMENTS 8,641,884 B2   2/2014   Hayashi et al.
9,108,351 B2   8/2015   Nakamatsu et al.
(Continued)

FOREIGN PATENT DOCUMENTS

EP   2602081 A  *  6/2013   ......... H01L 21/0274
JP   2013140314 A   7/2013
(Continued)

OTHER PUBLICATIONS

Translation of EP-2602081-A (published on Jun. 12, 2013).*
(Continued)

*Primary Examiner* — Leo B Tentoni
(74) *Attorney, Agent, or Firm* — VLP Law Group, LLP; David J. Thibodeau, Jr.

(57) ABSTRACT

Methods for forming optical articles with antireflective nanostructured (ARN) surfaces. An aluminum layer is deposited or otherwise applied to the cavity of an injection mold tool. Sequential chemical treatments such as anodization and etching steps form an ARN mold texture on the interior surface of the cavity. The ARN mold texture is a negative of a desired surface texture of the article. During injection molding, the desired ARN surface is thereby produced in the optical article.

19 Claims, 8 Drawing Sheets

(51) Int. Cl.
  *B29C 45/37*   (2006.01)
  *B29D 11/00*   (2006.01)
  *C25D 11/02*   (2006.01)
  *C25D 11/04*   (2006.01)
  *C25D 11/06*   (2006.01)
  *C25D 11/08*   (2006.01)
  *C25D 11/12*   (2006.01)
  *C25D 11/24*   (2006.01)
  *C25D 11/36*   (2006.01)
  *G02B 1/118*   (2015.01)
  *B29L 11/00*   (2006.01)

(52) U.S. Cl.
  CPC .. *B29D 11/00192* (2013.01); *B29D 11/00365* (2013.01); *B29D 11/00375* (2013.01); *B29D 11/00865* (2013.01); *C25D 11/022* (2013.01); *C25D 11/12* (2013.01); *C25D 11/24* (2013.01); *B29C 2033/385* (2013.01); *B29L 2011/00* (2013.01); *G02B 2207/101* (2013.01)

(58) Field of Classification Search
  USPC ......... 264/2.5, 337, 338, 341; 205/324, 682; 216/102
  See application file for complete search history.

(56) References Cited

U.S. PATENT DOCUMENTS

| | | | |
|---|---|---|---|
| 9,127,371 | B2 | 9/2015 | Isurugi et al. |
| 9,469,056 | B2 | 10/2016 | Isurugi et al. |
| 9,797,059 | B2 | 10/2017 | Ikawa et al. |
| 2008/0143015 | A1 | 6/2008 | Lee et al. |
| 2011/0053094 | A1 | 3/2011 | Yang et al. |
| 2011/0297640 | A1 | 12/2011 | Isurugi et al. |
| 2012/0218639 | A1 | 8/2012 | Minoura et al. |
| 2013/0094089 | A1 | 4/2013 | Isurugi et al. |
| 2014/0320970 | A1* | 10/2014 | Kamiyam ............. B29C 59/022 359/601 |
| 2015/0050455 | A1 | 2/2015 | Kojima et al. |
| 2015/0140154 | A1 | 5/2015 | Kaisha et al. |
| 2015/0241603 | A1* | 8/2015 | Fujii ....................... G02B 1/11 359/601 |
| 2019/0174752 | A1 | 6/2019 | Yamada et al. |

FOREIGN PATENT DOCUMENTS

| | | | | |
|---|---|---|---|---|
| JP | 2017170853 | A | | 9/2017 |
| JP | 2017173690 | A | | 9/2017 |
| KR | 20060002058 | A | * | 1/2006 ......... H01L 21/7684 |
| KR | 20130099656 | A | | 9/2013 |
| WO | 2013011953 | A1 | | 1/2013 |
| WO | WO-2016104555 | A1 | * | 6/2016 ................ C08J 5/18 |

OTHER PUBLICATIONS

Translation of KR-20060002058-A (published on Jan. 9, 2006).*
International Search Report and Written Opinion dated Oct. 4, 2021 issued for Related PCT/US21/29278.

* cited by examiner

METHOD FOR PRODUCING OPTICAL ARTICLE WITH ANTI-REFLECTIVE SURFACE, AND OPTICAL ARTICLE WITH ANTI-REFLECTIVE SURFACE

CROSS REFERENCE TO RELATED APPLICATION(S)

This application claims priority to a U.S. Provisional Patent Application Ser. No. 63/015,935 filed Apr. 27, 2020 entitled "Method for Producing Optical Article with Anti-Reflective Surface, and Optical Article with Anti-Reflective Surface", the entire contents of which are hereby incorporated by reference.

GOVERNMENT LICENSE RIGHTS

This invention was made with Government support under contract DE-SC0019878 awarded by the Department of Energy. The Government has certain rights in the invention.

TECHNICAL FIELD

This patent application relates to a method for producing optical articles with antireflective surfaces to minimize undesired reflections. It also relates to optical articles manufactured using the method and featuring anti-reflective surfaces in order to improve performance in any optical device such as a camera, lighting fixture, or others.

BACKGROUND

Injection molding is a common method of producing optical elements for many industries, including illumination. These optical elements include lenses, collimators, waveguides, diffusers, and covers among others. Injection molding is commonplace because of the ability to produce hundreds of thousands or millions of parts from the same mold. Even expensive mold production and finishing techniques can become inexpensive on a per part basis at high volumes. There are many optical grade polymers that are utilized in the injection molding of optical elements, and these exhibit indices of refraction as low as 1.3 and as high as 1.75, with indices between 1.4 and 1.6 most common. Transmission from air into such an optical element, or from the optical element into air, is hindered by a Fresnel reflection that is a fundamental consequence of the mismatch of impedance between light propagation in air and in the polymer.

These Fresnel reflections are nearly always deleterious to product performance. In imaging applications, they result in ghost images and loss of intensity on the detector. In illumination applications, they can reduce the light that is directed into useful directions and increase undesirable light at angles which are perceived as glare. Many optical applications require suppression of these Fresnel reflections to achieve required performance. The most common method of reducing reflection is the vacuum deposition of single or multi-layer dielectric materials to create either an intermediate index transition, or destructive interference of the reflected power. These vacuum deposited coatings have drawbacks, however. Their performance depends strongly on the wavelength of light and incident angle, and thus can cause color artifacts. In addition, their cost is typically high, which limits their use to higher value optical products, such as cameras and telescopes, and restricts their use in a very wide range of other applications.

Nanostructured gradient index anti-reflection coatings have been known for decades and are an alternative to vacuum deposited anti-reflection films. These anti-reflective nanostructures (ARNs) utilize sub-wavelength features to create a transition zone with an index of refraction that is effectively intermediate, and possibly with a gradient between air and the higher index bulk. The most widely known of these ARNs involves arrays of cones on a surface and is often referred to as a "motheye" structure due to its biomimetic origin in the eyes of moths, where suppressing reflected light served an evolutionary purpose.

FIG. 1 shows a typical motheye ARN 11. The substrate 10 features densely-packed cones 12 that protrude from its surface. The base diameter 15 of the cones is preferably between 50 nm and 500 nm, and the height 16 of the cones is preferably between 50 nm and 500 nm.

Many methods of fabricating motheye structures have been reported. One particularly attractive method from a scalable manufacturing perspective is via anodization of aluminum. Anodization results in a patterned oxide on aluminum. By careful control of the anodization process, and by also performing pore-opening etches, tapered pits can be generated on an aluminum surface, with the proper geometry to serve as an "ARN mold," i.e. the negative of the ARN surface 11 shown in FIG. 1. Anodization is already demonstrated as a fabrication method for master molds used for casting or curing, or on a drum used in a roll-to-roll process. This existing method, however, can only generate ARN on planar films with zero Gaussian curvature. No current methods are able to impart the ARN on arbitrarily curved surfaces formed by injection molding.

SUMMARY OF PREFERRED EMBODIMENTS

Described herein is a method for producing ARN on arbitrarily curved surfaces formed by injection molding. The method works by forming an "ARN mold" texture on the interior of an injection mold tool, where the ARN mold is the negative of the surface texture that will be formed on the final injection-molded part. The ARN mold texture is produced via sequential chemical treatments performed on an aluminum layer applied to the interior of the mold, including anodization and etching. Subsequent injection molding of optical parts in the mold produces optical parts with the ARN replicated in their surfaces. The method may be applied to optical parts of any arbitrary shape.

In one particular aspect, a method to produce an optical article with a motheye antireflective nanostructured (ARN) surface may proceed as follows. First, a mold is provided having a cavity defining a shape for the article, with the cavity having a surface layer formed of aluminum. The surface layer of aluminum may be deposited onto the cavity surface of the mold. If the mold itself is made of aluminum or an aluminum alloy, then such a deposition step may optionally be omitted and the native aluminum surface of the mold cavity utilized.

Next, an ARN-mold surface texture is imparted to the aluminum layer via a series of sequential chemical treatments involving, for example, anodization and etching of the aluminum layer. This results in a surface morphology comprising an array of pits. The ARN article is then produced by the injecting a transparent optical resin into the mold to fill the cavity.

The pits may be tapered. For example, the pits may have a depth of between 50 nm and 500 nm and an opening diameter of the pits may be between 50 nm and 500 nm. A depth-to-opening-diameter aspect ratio of the pits may, in some embodiments, be between 1 and 2.

When the aluminum layer is deposited, the deposition may be via electroplating, vacuum deposition, sputtering, or other techniques that provide a conformal aluminum coating. Additional material layers may be deposited on the mold before depositing the high-purity aluminum, in order to assist with the deposition of a high-quality, conformal, and well-adhered aluminum layer. The deposition step may deposit the aluminum only over selected areas depending upon where the ARN-mold surface texture is to be imparted. In an optional step, the deposited high purity aluminum layer may be machined and/or polished to provide a desired surface shape.

The aluminum surface layer may be between 90% and 100% aluminum by mass, and is preferably at least 98% and most preferably at least 99.9% aluminum.

A deposited aluminum layer may have a thickness of at least 50 nm, and preferably between 200 nm and 1 micron.

The anodization step may be carried out via a phosphoric acid based electrolyte operated under an applied voltage. In such implementations, the electrolyte may preferably be between 0.1% and 2% H3PO4 by weight; the applied voltage is between 160 V and 190 V to further control pit depth and diameter; and a temperature that controls relative rates of oxidation and etching of the aluminum is preferably between 0° C. and 10° C. Oxalic acid may also be used as an anodization electrolyte.

After the anodization step the pores of the pits may be widened via a phosphoric acid etch. This pore widening step may be performed with no anodic bias and concentration of phosphoric acid between 2% and 10% H3PO4 by weight; or performed in a controlled temperature bath, preferably between 25° C. and 35° C. A mixture of chromic acid and phosphoric acid may be used during the pore widening etch step.

In some embodiments, the method may include a second, shorter duration, anodization carried out subsequent to the widening step, to further form tapered pits, and a final etch may further provide smoothed profiles of the tapered pits.

A release layer may be applied to the resulting ARN mold surface. In that case, the release layer may include a less than 10 nm layer applied conformally as a molecular monolayer; or be formed of a fluorinated silane compound.

The resin forming the article may be selected from polymethyl methacrylate, polycarbonate, cyclic olefins, polysiloxane or epoxy-type materials.

Also described are injection-molded optical components with ARN surfaces, and a u) variety of products incorporating such injection-molded optical components such as lighting fixtures, cameras, visioning systems, and more.

DESCRIPTION OF THE SPECIFIC EMBODIMENTS

1. Method

Figure 1:
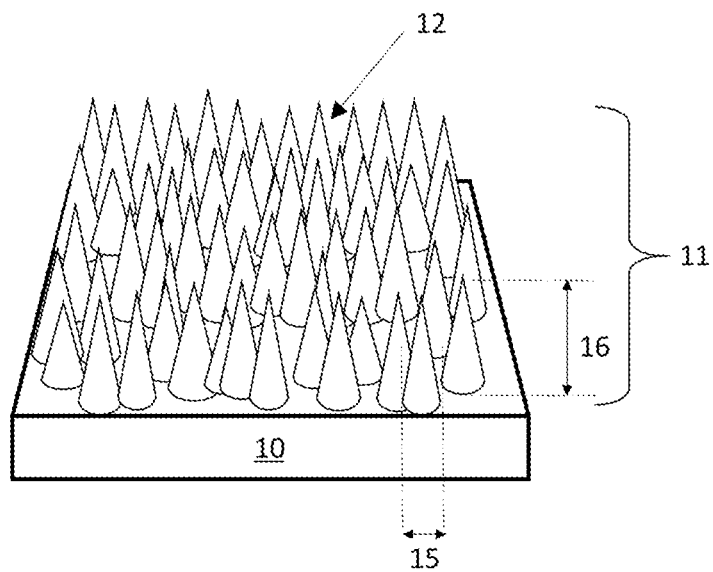
FIG. 1—Close-up perspective of "moteye" type antireflective surface.
Figure 2:
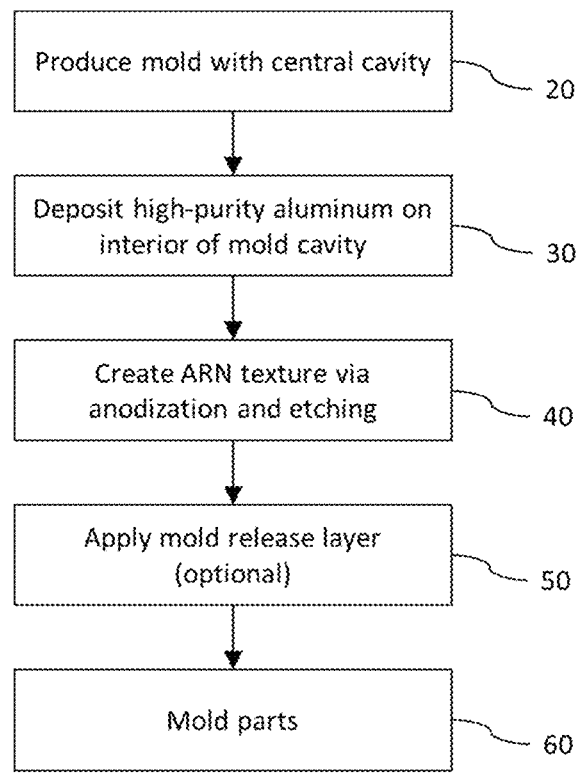
FIG. 2—Flowchart of method for producing optical article with antireflective surface.

FIG. 2 provides a flow chart describing the steps in a method to produce a moteye antireflective nanostructured (ARN) surface.

In the first step of the method, 20, a mold is produced using any conventional means of mold preparation. The mold may be made of any common mold making metal, including alloys of aluminum and alloys of steel, polymer materials such as urethanes and silicones, or other materials. The mold includes at least one piece, but typically at least two mating pieces, and may include additional pieces (e.g. slides and lifters) for molding of complex features. A cavity in the mold pieces defines the shape to be molded. The cavity may be produced using any common method, such as computer-controlled machining.

In the second step of the method, 30, a thin layer of high-purity aluminum is deposited onto the interior surface of the cavity. This layer of aluminum may be deposited via electroplating, vacuum deposition methods such as sputtering, or other techniques that provide a conformal coating. It may be deposited over the entire interior surface of the mold, or only in certain areas where the ARN surface texture is desired. The coated area may be controlled, for example, by masking the portions of the interior mold surface where coating is not desired during the deposition process. The composition of the aluminum layer may be between 90% and 100% aluminum by mass, and is preferably at least 98% and most preferably at least 99.9% aluminum. The thickness of the aluminum layer is at least 50 nm, and is preferably between 200 nm and 1 micron. Additional layers of material may be deposited on the mold prior to the aluminum layer, as "strike," "seed," or "adhesion" layers that aid in the subsequent deposition of a uniform conformal and well-adhered aluminum layer. The deposited aluminum layer may optionally be machined or polished in order to provide a desired shape and surface finish. The shape of the mold cavity may be designed to account for the thickness of the added material in order to produce the desired end shape for the molded part. The deposition of this aluminum layer and any seed or adhesion layers may optionally be omitted if the mold itself is made of aluminum or an aluminum alloy.

In the third step of the method, 40, the ARN mold surface texture is imparted to the aluminum coating on the interior surface of the mold using a series of sequential chemical treatments involving anodization and etching of the aluminum to produce a desired surface morphology. This desired morphology is preferably a dense array of tapered pits, where the depth of the pits is preferably between 50 nm and 500 nm and the opening diameter of the pits is preferably between 50 nm and 500 nm. The depth-to-opening-diameter aspect ratio is preferably between 1 and 2, although larger aspect ratios may be desirable as well. Other morphologies may also be acceptable, including pits without tapering. The ARN mold morphology may be applied to the entire interior surface of the mold cavity, or selectively to certain areas by masking the other areas during the chemical treatments.

The chemical treatments to form the ARN mold morphology on the prepared mold surface involve sequential anodization and etching of the applied Al mold surface. Anodization involves submersion of the article to be textured in an acidic electrolyte. Regions of the mold where anodization texture is not desired may be physically masked via tape or lacquer masking material. A positive bias is applied to the anode and the circuit ground or negative terminal is connected to a conductive electrode that is preferably electrochemically stable in the chosen electrolyte. The cathode and anode should be positioned at sufficient distance from each other that incidental contact is prevented. The electrolyte may be agitated by bubbling or spinning so as to prevent bubble formation from affecting the anodization morphology, and to effectively remove heat generated via the anodization process. The process conditions for anodization steps may vary, and there are several suitable chemistries. Each anodization step may require suitable degreasing and cleaning of the surface prior to anodization.

One preferred process involves a phosphoric acid based anodization operated under controlled voltage conditions. The composition of the electrolyte during anodization is preferably between 0.1% and 2% $H_3PO_4$ by weight. The pit diameter and pitch is controlled by the applied voltage, which is preferably between 160 V and 190 V. The anodization bath temperature may be controlled to control the relative rates of oxidation and etching of the Al surface during the anodization process, and is preferably between 0° C. and 10° C. Another possible chemistry uses oxalic acid as the anodization electrolyte.

The anodization step is preferably followed by an etch step to widen the anodization etch pits. This pore widening etch may be performed with no anodic bias and a higher concentration of phosphoric acid, between 2% and 10% $H_3PO_4$ by weight, with 6 wt % a preferred concentration. The pore widening etch may be performed in a controlled temperature bath, preferably between 25° C. and 35° C. The pore-widening etch may be performed with a mixture of chromic acid and phosphoric acid.

A second, shorter duration, anodization step may then be carried out to form the tapered pits, and a final etch may be used to produce smooth tapered profiles in the pits. Further cycles of anodization and etching may be performed in order to produce an optimal surface.

In the fourth step of the method, 50, a release layer is optionally applied to the ARN mold surface to aid in de-molding. The release layer is very thin (preferably less than 10 nm) and preferably applied conformally to the surface as a molecular monolayer. Various release layer chemistries are possible. One preferred type of release layer is fluorinated silane compounds, such as the Dow Corning product DC-2634 or the 3M product EGC-1720. The application of these surface coatings follows procedures recommended by their manufacturers, and involves a washing step after surface fixing in order to remove excess unbound material.

In the final step of the method, 60, the mold is used to produce replicated parts. For injection molding operation, a transparent optical resin is melted and injected into the cavity at a suitable temperature and pressure that ensure filling of the ARN mold texture within the mold cavity. The mold is then cooled and the formed part is ejected from the mold. The resin may be chosen from any suitable material, including polymethyl methacrylate, polycarbonate, cyclic olefins, and others. The molds may also be used with other types of resins, such as polysiloxane or epoxy-type materials that may be injected as liquids at room temperature and cured via the application of temperature, radiation, or via chemical reaction over time. Yet another forming option is compression molding or embossing, in which a solid polymer is forced to flow into an open mold cavity through the application of pressure and heat.

Figure 3A:
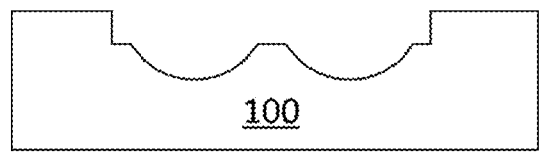
FIG. 3A—Cross-section of mold at end of first step.
Figure 3B:
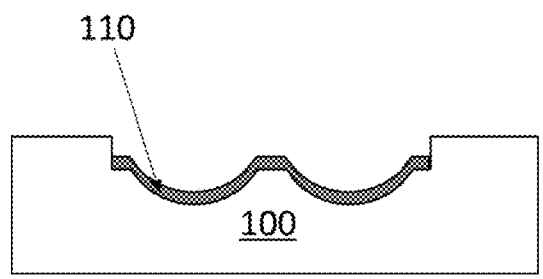
FIG. 3B—Cross-section of mold at end of second step.
Figure 3C:
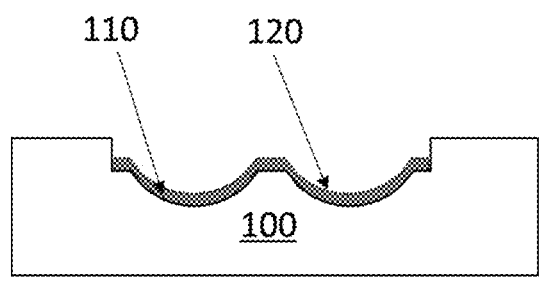
FIG. 3C—Cross-section of mold at end of third step.

FIGS. 3A to 3C provide an example cross-section of a mold piece 100. In this example, the mold cavity has two concave depressions so that the molded part will feature two side-by-side convex lenses.

FIG. 3A shows the mold piece 100 as formed during the first step (20).

FIG. 3B shows the mold piece at the completion of the second step (30). A layer of high-purity aluminum 110 conforms to the interior of the mold cavity. As described previously, the composition of the aluminum layer 110 may be between 90% and 100% aluminum by mass, and is preferably at least 98% and most preferably at least 99.9% aluminum. The thickness 111 of the aluminum layer 110 is at least 50 nm, and is preferably between 200 nm and 1 micron. The layer 110 is not drawn to scale in FIG. 3(*b*).

FIG. 3C shows the mold piece at the completion of the third step (40). The anodization and etching processes have created an ARN mold surface texture 120 on the layer 110 that is conformal to the shape of the interior cavity of the mold. The layer 110 is not drawn to scale in FIG. 3C.

Figure 4:
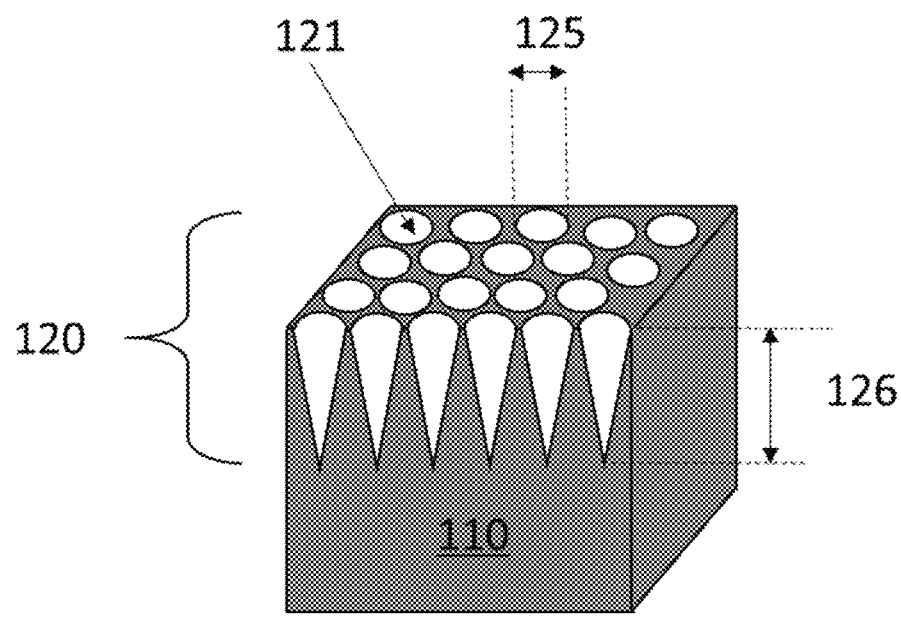
FIG. 4—Close-up perspective view of cut section of mold interior at end of third step.

FIG. 4 shows a close-up perspective view of a cutaway portion of the mold cavity interior after the completion of the third step (40). It shows that the surface texture 120 in the layer 110 is composed of a dense array of tapered pits 121. As described earlier, the depth 126 of the pits 121 is preferably between 100 nm and 500 nm and the opening diameter 125 of the pits 121 is preferably between 50 nm and 500 nm. The depth-to-opening-diameter aspect ratio is preferably between 1 and 2, although larger aspect ratios may be desirable as well.

Figure 5:
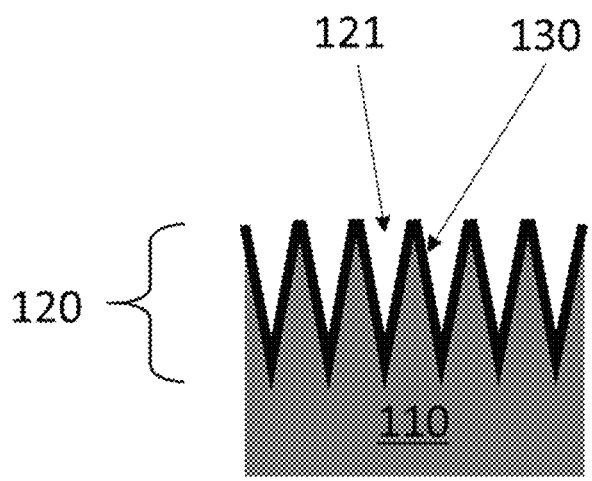
FIG. 5—Close-up cross-section view of mold at end of optional fourth step.

FIG. 5 shows a close-up perspective view of a cutaway portion of the mold cavity interior after the completion of the optional fourth step (50). A release layer 130 is present on the mold cavity interior, conforming to the surface texture 120 comprised of the tapered pits 121. The layer 130 is not drawn to scale in FIG. 5.

Figure 6:
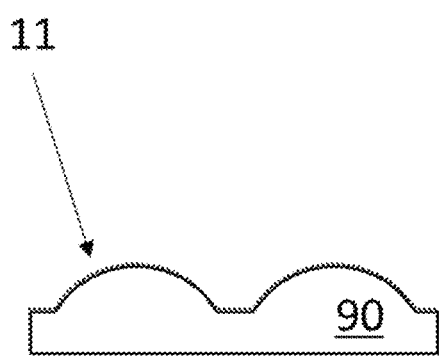
FIG. 6—Cross-section view of molded article at end of fifth step.

FIG. 6 shows the injection molded part 90 produced with the example mold 100 in the final step (60). The molded part features two side-by-side plano-convex lenses with ARN surface texture 11 present on the convex faces of the molded part 90.

2. Products

Many products may be produced or enabled using the process described herein. Optical products including molded ARN textures include flat or curved windows; lenses of various types including plano-convex, plano-concave, double-convex, double-concave, and meniscus-types; prisms; Fresnel lenses; freeform optics; TIR optics; diffusers; waveguides; monolithic arrays of lenses, prisms, or other optical elements; and more. Using the method described above, the ARN texture may be applied to one or more sides of any given optical element.

Such optics with molded ARN surfaces may be used in a wide variety of products, including lighting fixtures; cameras; machine vision systems; binoculars; telescopes; microscopes; glasses; safety goggles; and more.

Figure 7:
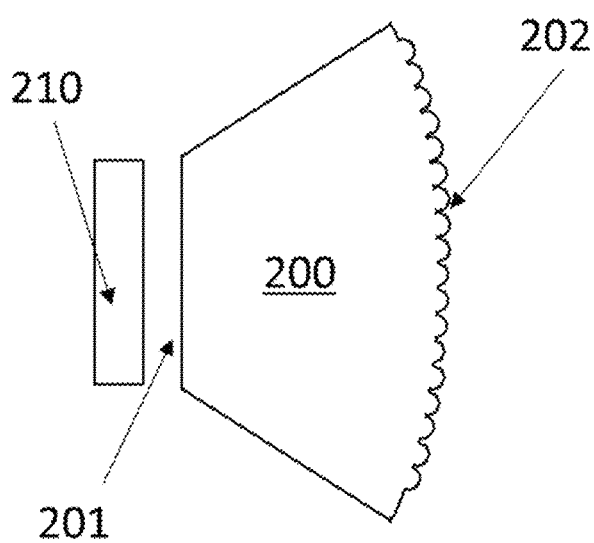
FIG. 7 Cross-section view of elements in a lighting fixture product including a lens formed using the described method.

FIG. 7 shows a lighting fixture in which an injection-molded lens 200 with a complex surface focuses and distributes the light from a light source 210 to form a spotlight beam. The lens 200 features molded ARN on both its input and output surfaces 201 and 202.

Figure 8:
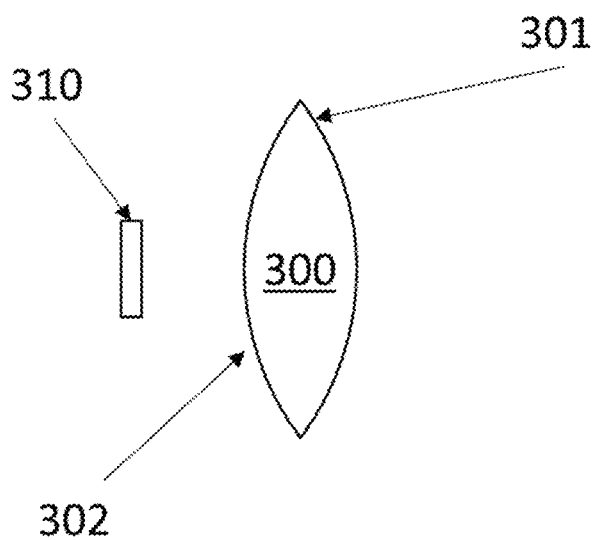
FIG. 8—Cross-section view of elements in an imaging product such as a camera, including a lens formed using the described method.

FIG. 8 shows a camera or machine vision system in which an injection-molded lens 300 focuses light onto a sensor 310. The lens 300 features molded ARN on both its input and output surfaces 301 and 302. More complex camera systems may feature multiple similar lenses.

These examples are not exhaustive, and other useful implementations will be evident to those skilled in the art.

The invention claimed is:

1. A method to produce an optical article with a motheye antireflective nanostructured (ARN) surface comprising:
   providing a mold having a cavity defining a shape for the optical article, the cavity having a surface layer formed of aluminum;
   imparting an ARN-mold surface texture to the aluminum layer via a series of sequential chemical treatments involving anodization and etching of the aluminum layer to thereby produce a surface morphology comprising an array of tapered pits;
   producing the optical article having an ARN surface by further steps of
      injecting a transparent optical resin into the mold to fill the cavity, wherein the optical resin is chosen from a group consisting of including polymethyl methacrylate, polycarbonate, cyclic olefins, and polysiloxane;
      cooling the mold; and
      removing the formed optical article from the mold.

2. The method of claim 1 wherein the mold is formed of aluminum or aluminum alloy and the surface layer is an integral part of the mold.

3. The method of claim 1 wherein the method additionally comprises:
   depositing the aluminum surface layer onto the mold.

4. The method of claim 3 further comprising:
   depositing additional material layers between the mold and the high-purity aluminum layer, for assisting with the deposition of a high-quality, conformal, and well-adhered aluminum layer.

5. The method of claim 1 wherein the pits are tapered and further wherein the pits either
   (a) have a depth of between 50 nm and 500 nm;
   (b) have an opening diameter between 50 nm and 500 nm; or
   (c) have a depth-to-opening-diameter aspect ratio of between 1 and 2.

6. The method of claim 3 wherein the step of depositing the high purity aluminum layer deposits aluminum only over selected areas depending upon where the ARN-mold surface texture is to be imparted.

7. The method of claim 1 wherein the ARN-mold surface texture is confined to selected areas of the mold by further:
   masking other portions of an interior surface of the mold during the process of imparting the ARN-mold surface texture.

8. The method of claim 1 wherein the aluminum layer is between 90% and 100% aluminum by mass.

9. The method of claim 3 wherein the aluminum layer has a thickness of at least 50 nm.

10. The method of claim 3 wherein the aluminum layer is machined or polished to produce a desired surface shape.

11. The method of claim 1 wherein the anodization additionally comprises:
   anodization via a phosphoric acid based electrolyte operated under an applied voltage.

12. The method of claim 11 additionally wherein
   the electrolyte is between 0.1% and 2% H3PO4 by weight; or
   wherein the applied voltage is between 160 V and 190 V to further control pit depth and diameter; or
   wherein a temperature of the anodization step controls relative rates of oxidation and etching of the aluminum, and is between 0° C. and 10° C.

13. The method of claim 1 wherein the etching step additionally comprises:
   widening pores of the pits via a phosphoric acid etch.

14. The method of claim 13 wherein the pore widening step is further
   performed with no anodic bias and concentration of phosphoric acid between 2% and 10% H3PO4 by weight; or
   performed in a controlled temperature bath, between 25° C. and 35° C.

15. The method of claim 1 wherein the sequential chemical treatments comprise:
   a first anodization step;
   a first pore-widening etch step;
   a second, shorter duration, anodization step;
   a final etch step for providing smoothed profiles of the tapered pits.

16. The method of claim 1 additionally comprising:
   applying a release layer to the ARN mold surface.

17. The method of claim 16 wherein the release layer comprises:
   a less than 10 nm layer applied conformally as a molecular monolayer; or
   formed of a fluorinated silane compound.

18. The method of claim 1 wherein the optical article comprises a plano-convex, plano-concave, double-convex, double-concave, meniscus-type or Fresnel lens.

19. The method of claim 1 wherein the optical article comprises a a freeform optic; a TIR optic; an optical waveguide; or a monolithic array of lenses, or prisms.

* * * * *